United States Patent Office 3,126,414
Patented Mar. 24, 1964

3,126,414
4-ALKOXY-5-HALO-2-HYDROXY-BENZOPHENONES
Sydney M. Spatz, Buffalo, and Russell I. Steiner, Williamsville, N.Y., assignors to Allied Chemical Corporation, New York, N.Y., a corporation of New York
No Drawing. Filed May 7, 1958, Ser. No. 733,474
4 Claims. (Cl. 260—591)

This invention relates to the stabilization of material subject to deterioration by ultraviolet light. It relates more particularly to compositions resistant to ultraviolet light and to processes for making them.

Many materials are subject to deterioration by ultraviolet light, and considerable research has been devoted to the discovery of compounds which will stabilize them against such action. The problem is complicated by the fact that the materials to be stabilized are of various nature and the stabilizer must not impart other objectionable properties in effecting stabilization. Thus the materials to be stabilized include organic plastics, resins, perfumes, foodstuffs, and the like. Many organic plastics tend to become discolored, pitted, brittle, or otherwise undesirable, under the action of ultraviolet light.

To be effective, a stabilizer should absorb the undesired ultraviolet light without itself undergoing undesirable change (it should be stable); it should be compatible with the material it is to protect; it preferably should be colorless or substantially colorless; it should not interfere with other components of compositions in which it is incorporated (such as, catalysts or other components employed in resinous compositions to be polymerized); and it should be effective in relatively small amounts.

We have discovered that a certain class of derivatives of 2-hydroxy-benzophenone, described more fully below, are excellent absorbents for ultraviolet light, especially of the range 350–400 mμ, and possess a number of other desirable properties, thereby rendering them especially useful as stabilizers for substances sensitive to ultraviolet light. We have also discovered a number of new compounds falling within said class of stabilizers, as well as a process of making certain of them.

The 2-hydroxy-benzophenones employed as stabilizers or inhibitors in accordance with the present invention are 2,4-dihydroxy-benzophenones (resbenzophenones) and their 4-alkoxy-derivatives in which the hydrogen atom in the 5-position, or both the 3- and 5-hydrogen atoms, are substituted by bromine or chlorine. Such 2-hydroxy-benzophenones have the formula

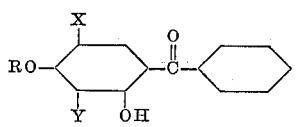

wherein

R is selected from the group consisting of hydrogen and alkyl (hydrocarbon alkane),
X is selected from the group consisting of bromine and chlorine, and
Y is selected from the group consisting of hydrogen, bromine and chlorine.

The alkyl group represented by R includes lower alkyl groups, such as methyl, ethyl, propyl, isopropyl, and the various butyl and amyl groups, as well as higher alkyl groups such as hexyl, heptyl, octyl, nonyl, decyl, dodecyl, tetradecyl, hexadecyl, and octadecyl. Those in which the alkyl group contains 1 to 12 carbon atoms are preferred.

We have discovered that such 2-hydroxy-benzophenone compounds, in which the halogen atoms are in the same benzene nucleus as the hydroxyl groups (that is, in the resorcyl radical) are more effective stabilizing agents for material subject to deterioration by ultraviolet light, and especially unsaturated polyester resinous compositions and polyvinyl ester resins, than are the compounds in which the halogen is in the other benzene nucleus, such as 3'- or 4'-bromo-2,4-dihydroxy-benzophenone, as disclosed and claimed in our application Ser. No. 99,980, filed April 3, 1961.

The compounds employed in accordance with the said invention are especially suitable since they possess the additional advantages of being stable under the conditions of intended use, contribute little or no color to the composition, and when used with such prepolymers or monomers as polyesters, vinyl esters and the like do not cause premature gelation or retard the subsequent polymerization.

The improved ultraviolet stabilizers employed in accordance with said invention are of particular value when used to protect polyester resins, such as those prepared by reacting an alpha, beta unsaturated polycarboxylic acid with an aliphatic polyhydric compound, and especially a dihydric aliphatic alcohol, and admixing the polyester with a polymerizable ethylenically unsaturated compound.

Polyvinyl esters such as polyvinyl chloride, polyvinyl acetate and the like, as well as mixtures, also can be stabilized by the incorporation of minor amounts of the halogenated 2-hydroxybenzophenone compounds of this invention (herein referred to as halogenated resbenzophenones).

The halogenated resbenzophenones are generally compatible with the resinous masses. In most instances only relatively small quantities of the order of 0.01% to 1.0% by weight of the mass are required to impart stabilizing effects, although amounts ranging from 0.01% to 5% will generally include the optimum concentration of stabilizing agent. The optimum concentration to be employed is not critical and will differ with the particular application, nature of the material, and thickness of the film. The practical concentration to be employed can be readily determined by trial experiments easily performed by those skilled in this art. However, in no instance is an amount more than 25% by weight required.

In general it is convenient to add the stabilizer in solid form to the warm prepolymeric mass, and to agitate the mixture to effect solution. At times it may be convenient or desirable to introduce the stabilizer in the form of an aqueous dispersion or solution in an organic solvent. The non-reactive character of these stabilizers is of advantage, since no special care need be exercised in effecting their incorporation in the light sensitive compositions.

Many of the above 2-hydroxy-benzophenones are new compounds and the invention accordingly includes such compounds as a feature thereof.

Thus the following are new:

5-chloro-2,4-dihydroxy-benzophenone;
3,5-dichloro-2,4-dihydroxy-benzophenone;
All of the above 4-alkoxy-5-bromo-2-hydroxy-benzophenones;
All of the above 4-alkoxy-3,5-dibromo-2-hydroxy-benzophenones;
All of the above 4-alkoxy-5-chloro-2-hydroxy-benzophenones; and
All of the above 4-alkoxy-3,5-dichloro-2-hydroxy-benzophenones.

Said new compounds are included in the following formula:

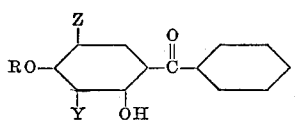

wherein

R is selected from the group consisting of hydrogen and alkyl,
Z is selected from the group consisting of bromine and chlorine but is chlorine when R is hydrogen; and
Y is selected from the group consisting of hydrogen, bromine and chlorine.

The halogenated 2-hydroxy-benzophenones employed as stabilizers in accordance with the present invention can be obtained in various ways. A method which we have found to lead to high yields of halogenated compounds comprises treating the corresponding hydroxy-benzophenone, in solution in a non-reactive solvent (that is, a solvent which does not react with the hydroxy-benzophenone nor with the halogen), with bromine or chlorine, and controlling the temperature to avoid excessive heating.

Thus we have discovered, as an additional feature of the invention, that both the 5-bromo- and 3,5-dibromo-2,4-dihydroxy-benzophenones can be prepared in excellent yields by adding free bromine to a solution of resbenzophenone in a non-reactive solvent (such as dioxane, a lower dialkylether, chlorobenzene, benzene, glacial acetic acid, chloroacetic acid or mixtures of such solvents) under conditions of strict temperature control. At temperatures below 25° C., and preferably at 10° to 16° C., the 5-monobromo derivative is obtained in yields of about 90%. At temperatures of 25° to 50° C., and preferably 35° to 45° C., the 3,5-dibromo derivative is obtained in about 90% yields.

The corresponding 5-chloro and 3,5-dichloro derivatives of resbenzophenone can be obtained in an analogous fashion. Higher temperatures are required, however. Thus, by passing gaseous chlorine into a solution of resbenzophenone in a non-reactive solvent maintained at a temperature not exceeding about 40° C. until at least the amount of chlorine required for the chlorination has been absorbed, the said corresponding chlorinated resbenzophenones are obtained in excellent yields.

The 4-alkoxy-2-hydroxy-benzophenones also can be halogenated in like manner, higher temperatures also being required. Thus, the mono-halogenation of 2-hydroxy-4-methoxy-benzophenone is carried out at 25° to 40° C., and its dihalogenation at 50° to about 85° C.

The invention will be illustrated by the following specific examples, but it is to be understood that it is not limited to the details thereof and that changes may be made without departing from the the scope of the invention. The temperatures are in degrees centigrade and the parts and percentages are by weight, unless designated as parts by volume. Where parts are by volume, the amount signifies the volume occupied by the same number of parts by weight of water at 4° C.

PREPARATION OF HALOGENATED RESBENZOPHENONES

*Example 1.*—A solution of 160 parts of bromine in 525 parts of glacial acetic acid was added dropwise over 1½ to 2 hours to a cold solution of 214 parts of resbenzophenone (2,4-dihydroxy-benzophenone) in 2100 parts of glacial acetic acid. The addition was made at temperatures between 10° and 16°. The mass was permitted to warm up to ambient room temperature and then was diluted with 5000 parts of water while agitating the mixture. The resultant slurry was filtered and the filter cake of 5-bromo-2,4-dihydroxy-benzophenone (5-bromo-resbenzophenone) was washed with two portions of water of 250 parts each. The washed product, after drying in vacuo at 50°, weighed 262 parts (89.3% of the theoretical yield) and had a melting point of 117° to 122°.

*Analysis.*—Calc. for $C_{13}H_9O_3Br$: Br, 27.26%. Found: Br, 28.18%.

*Examples 2 to 6.*—The bromination of 2,4-dihydroxy-benzophenone was repeated in the following solvents, the conditions and other process details being as set out in Example 1. The results are set out in the following table.

TABLE I

| Example | Solvent | Yield, Percent of Theoretical | M.P., degrees | Percent Br |
|---|---|---|---|---|
| 2 | Benzene | 58 | 116–121 | 25.4 |
| 3 | Chlorobenzene | 60 | 115–122 | 25.2 |
| 4 | Diethylether | 77 | 114–117 | 25.2 |
| 5 | Dioxane | 65 | 116–122 | 27.1 |
| 6 | Absolute Ethanol | 77 | 114–128 | 28.7 |

*Example 7.*—A solution of 160 parts of bromine in 262 parts of glacial acetic acid was added dropwise to a warm (35° to 40°) solution of 107 parts of resbenzophenone in 525 parts of glacial acetic acid. The temperature of the mass was maintained at 35° to 40° during the addition, which required between 1½ and 2 hours. The resultant slurry was filtered and the filter cake of 3,5-dibromo-2,4-dihydroxybenzophenone (3,5-dibromo-resbonzophenone) was washed with 250 parts of water, then with 250 parts of 5% aqueous sodium thiosulfate solution and finally with 250 parts of water. An additional quantity of the dibromo-compound was obtained by diluting the filtrate with about 1500 parts of water, filtering and washing as described above. The total yield of 3,5-dibromo-2,4-dihydroxybenzophenone obtained, after being dried in vacuo at 50°, amounted to 166 parts (89% of the theoretical yield) of material melting at 148° to 150.5°.

*Analysis.*—Calc. for $C_{13}H_8O_3Br_2$: Br, 42.96%. Found: Br, 41.5%, 42.0%.

*Example 8.*—Chlorine was passed at a slow rate into a warm (30° to 35°) solution of 53.5 parts of resbenzophenone in 525 parts of glacial acetic acid until 17.8 parts of chlorine had been absorbed. The resultant solution was agitated for ½ hour at 30° to 35°, and then diluted with 500 parts of water. The slurry was filtered and the filter cake was washed with two portions of water of 100 parts each. The washed cake was dried in vacuo at 50°. The product, melting at 131° to 139°, was a mixture of 5-chloro- and 3,5-dichloro-resbenzophenones.

On further dilution of the filtrate with about 1000 parts of water, filtering and washing, an additional product was obtained, melting at 117° to 128°. It was essentially 5-chloro-resbenzophenone containing some unchlorinated resbenzophenone.

*Example 9.*—A solution of 168 parts of bromine in 525 parts of glacial acetic acid was added dropwise to a warm (30° to 35°) solution of 228 parts of 2-hydroxy-4-methoxy-benzophenone in 1049 parts of glacial acetic acid. The resultant slurry was agitated for 2 hours after the addition was complete and then the mixture was permitted to stand for about 16 hours without further temperature control. The resultant slurry was filtered and the filter cake was washed with 500 parts of water, then with 250 parts of 5% aqueous sodium thiosulfate solution and lastly with 500 parts of water. An additional quantity of product was obtained by diluting the filtrate with 220 parts of water, vigorously agitating the mixture, filtering the resultant slurry, and washing as indicated above. The filter cakes were combined and dried in vacuo at 50°. Thus there were obtained 148 parts (50% of the theoretical yield) of 5-bromo-2-hydroxy-4-methoxy-benzophenone having a melting point of 127.8° to 128.2°.

*Analysis.*—Calc. for $C_{14}H_{11}O_3Br$: Br, 26.02%. Found: Br, 25.95%, 26.23%.

Mixed melting point determination made with the product of this example and the product obtained by methylating 5-bromo-resbenzophenone, as described below, showed the identity of the two products.

The methylation was carried out as follows: 13.2 parts of dimethyl sulfate were added dropwise over the course of a half-hour to a warm (40°) solution of 29.3 parts of 5-bromo-resbenzophenone (prepared as described in Example 1 above) in 29 parts of aqueous sodium hydroxide containing 4 parts of caustic soda, while maintaining the temperature of the mixture between 30° and 40°. After addition of the dimethyl sulfate, about 50 parts of water were added to permit the resulting slurry to be more easily agitated, and the mixture was agitated for 2½ hours and then rendered acid to Congo red by the addition of dilute hydrochloric acid. The slurry was filtered. On being recrystallized from aqueous acetone, the product (5-bromo-2-hydroxy-4-methoxy - benzophenone) melted at 124° to 127°.

*Example 10.*—A solution of 320 parts of bromine in 525 parts of glacial acetic acid was added to a hot (60°) solution of 228 parts of 2-hydroxy-4-methoxy-benzophenone in 1674 parts of glacial acetic acid. The addition was carried out at 60° to 65° and the mixture was maintained at said temperature for 2 hours after the bromine had been added.

Two products were obtained by fractional precipitation on gradual dilution of the reaction mixture with water. The first fraction, containing 35% bromine and melting at 74° to 85°, was a mixture of 5-bromo- and 3,5-dibromo-2-hydroxy-4-methoxy-benzophenones. The second fraction, containing 40.3% Br (theory for dibromo=41.4% Br) and melting at 93° to 96°, was 3,5-dibromo-2-hydroxy-4-methoxy-benzophenone.

*Example 11.*—Gaseous chlorine was passed into a solution of 57 parts of 2-hydroxy-4-methoxy-benzophenone in 525 parts of glacial acetic acid, maintained at 30°–35°, until 18.8 parts of chlorine had been absorbed. The mass was agitated at 30° to 35° for ½ hour after the addition was complete and then 150 parts of water were added. The resultant slurry was filtered and the filter cake of 5-chloro-2-hydroxy-4-methoxy - benzophenone was washed with two portions of water, each of 100 parts. The washed cake was dried in vacuo at 50°. An additional quantity of product was obtained by diluting the mother liquor with 250 parts of water.

*Example 12.*—Twenty-five parts of dodecyl-bromide were added dropwise, over about ½ hour, to a refluxing mixture of 29.3 parts of 5-bromo-2,4-dihydroxy-benzophenone, 4 parts of sodium hydroxide and 75 parts of absolute ethanol. The mixture was maintained refluxing for 7 hours thereafter and then agitated, without further heating, for about 16 hours. The resulting solution was rendered alkaline to litmus by the addition of caustic soda and then poured into 2500 parts of water, and the resulting precipitate of 5-bromo-4-dodecoxy-2-hydroxy-benzophenone was separated by filtration. The crude 5-bromo-4-dodecoxy-2-hydroxy-benzophenone was recrystallized from glacial acetic acid. The purified product melted at 77° to 83° and contained 16.7% Br (theory=17.3%)

The effectiveness of a compound as an absorber of ultarviolet rays is based in the first instance on its ability to screen out the destructive ultra-violet rays in the near region; namely, from 350 m$\mu$ to 400 m$\mu$, which is considered to be the practical range of ultraviolet radiation reaching the earth's surface from the sun.

To test the effectiveness of the halogenated hydroxybenzophenone compounds employed as stabilizers against the deleterious action of ultraviolet light in accordance with the present invention, the absorbency for ultraviolet light of solutions of compounds prepared in accordance with the above examples was measured in a standard spectrophotometer (Carey Model 11 Spectrophotometer) and compared with that of like solutions of related compounds sold commercially, or heretofore proposed, for the purpose. Readings were taken from 400 m$\mu$ down to 350 m$\mu$. The tests were carried out with solutions in methyl alcohol of the following compounds at a concentration of 25 milligrams of the compound per 100 cc.

| Compound No. | Composition |
|---|---|
| 1 | 5-bromo-2, 4-dihydroxy-benzophenone. |
| 2 | 3, 5-dibromo-2, 4 dihydroxy-benzophenone. |
| 3 | 5-chloro-2, 4-dihydroxy-benzophenone. |
| 4 | 5-bromo-2-hydroxy-4-methoxy-benzophenone. |
| 5 | 3,5-dibromo-2-hydroxy-4-methoxy-benzophenone |
| 6 | 5-bromo-2-hydroxy-4-dodecoxy-benzophenone. |
| 7 | 5-chloro-2-hydroxy-4-methoxy-benzophenone. |
| 8 | 2, 4-dihydroxy-benzophenone. |
| 9 | 3'-bromo-2, 4-dihydroxy-benzophenone. |
| 10 | 4'-bromo-2, 4-dihydroxy-benzophenone. |
| 11 | 2-hydroxy-4-methoxy-benzophenone. |
| 12 | 2-hydroxy-4-dodecoxy-benzophenone. |

The results are set out in Table II, below.

TABLE II

[Percent absorption between 350 and 400 m$\mu$]

| Compound No. | Wavelength in m$\mu$ | | | | | |
|---|---|---|---|---|---|---|
| | 400 | 390 | 380 | 370 | 360 | 350 |
| 1 | 8.8 | 29.2 | 68.4 | 96.0 | 100 | 100 |
| 2 | 10.9 | 30.8 | 68.4 | 94.5 | 100 | 100 |
| 3 | 14.9 | 33.9 | 71.8 | 96.8 | 100 | 100 |
| 4 | 8.8 | 30.8 | 72.5 | 96.8 | 100 | 100 |
| 5 | 16.9 | 41.0 | 76.0 | 96.0 | 100 | 100 |
| 6 | 14.9 | 35.4 | 72.5 | 96.0 | 100 | 100 |
| 7 | 14.9 | 33.9 | 72.5 | 97.2 | 100 | 100 |
| 8 | 2.0 | 20.6 | 49.9 | 87.4 | 99.5 | 100 |
| 9 | 14.9 | 20.6 | 49.9 | 84.9 | 99.0 | 100 |
| 10 | 14.9 | 24.2 | 53.2 | 88.8 | 99.4 | 100 |
| 11 | 6.7 | 14.9 | 42.4 | 80.0 | 99.0 | 100 |
| 12 | 2.2 | 8.8 | 27.5 | 65.3 | 95.4 | 100 |

STABILIZATION OF LIGHT SENSITIVE COMPOSITIONS BY MEANS OF HALOGENATED RESBENZOPHENONES

In order to determine the effectiveness of the halogenated resbenzophenones and related compounds of this invention to protect resinous compositions containing them against the deleterious effects of ultraviolet light, they were incorporated in small amounts into resinous compositions which are known to be adversely affected by ultraviolet light and the stabilizing effect on the compositions was determined by exposure in a Fade-Ometer.

The resinous compositions (prepolymers) employed were prepared as follows.

Polyester-Styrene Resins

RESIN A.—TETRABROMO-PHTHALIC ANHYDRIDE RESIN

A mixture of 233.4 parts of diethyleneglycol, 98 parts of maleic acid anhydride, 59.2 parts of phthalic acid anhydride and 278.4 parts of tetrabromo-phthalic acid anhydride was heated under reflux in an inert atmosphere at 175° until the acid number of the mass was reduced to about 65. The mass was cooled to 140° and then added to 276 parts of styrene (containing a small amount of hydroquinone as a stabilizer), and the mixture was cooled as rapidly as possible to prevent premature gelation.

RESIN B.—TETRACHLORO-PHTHALIC ANHYDRIDE RESIN

A similar prepolymer was prepared using 172 parts of tetrachlorophthalic acid anhydride in place of the tetrabromophthalic acid anhydride in the above process for making Resin A. Heating was continued until an acid number of 63.0 was obtained. The polyester mass was cooled to 140° and added to 230 parts of styrene (containing hydroquinone as stabilizer), and the mixture was cooled as quickly as possible, to prevent premature gelation.

RESIN C.—HEXACHLORO "NADIC" ANHYDRIDE RESIN

A polyester-styrene prepolymer mixture was made using 233 parts of hexachloro "Nadic" anhydride (1,4,5,6,7,7 - hexachloroendo - cis-bicyclo-[2,2,1]5-heptene-2,3-dicarboxylic acid anhydride) in place of the tetrabromophthalic acid anhydride in the above process for making Resin A . Heating at 170° to 175° was continued until an acid number of about 40 was obtained. The polyester mass was cooled to 140° and added to 252 parts of styrene (containing a stabilizing amount of hydroquinone) and the resulting mixture was cooled rapidly to prevent premature gelation.

RESIN D.—TETRACHLOROPHTHALIC ACID ANHYDRIDE RESIN CONTAINING NO PHTHALIC ANHYDRIDE

A similar polyester styrene mixture was prepared using 286 parts of tetrachlorophthalic acid anhydride in place of the phthalic and tetrabromophthalic acid anhydrides used in the above process for making Resin A. Heating at 170° to 175° was continued until an acid number of 66 was obtained. The polyester mass was cooled to 105° and 249 parts of styrene (containing a stabilizing amount of hydroquinone) was added. The mixture was cooled rapidly to prevent premature gelation.

RESIN E.—HEXACHLORO "NADIC" ANHYDRIDE RESIN CONTAINING NO PHTHALIC ANHYDRIDE

A polyester-styrene prepolymer mixture was made using 371.2 parts of hexachloro "Nadic" anhydride in place of the phthalic and tetrabromo phthalic acid anhydrides in the above process for making Resin A. Heating at 170° to 175° was continued until an acid number of 61 was obtained. The polyester mass was cooled to 100° and 285 parts of styrene (containing a stabilizing amount of hydroquinone) was added and resulting mixture cooled rapidly to prevent premature gelation.

Comparative tests were carried out with said prepolymers containing halogenated hydroxy-benzophenones as stabilizers in accordance with the present invention, with no stabilizer (blank), and with commercially available or previously proposed stabilizers.

One set of tests was carried out in the following manner:

*Example 13.*—To 10 parts of polyester-styrene prepolymer prepared as described above (Resin A, B or C), 0.1 part of the stabilizer to be tested was added and dissolved by heating on a steam bath. A few drops of a commercial polymerization catalyst comprising methyl-ethyl ketone peroxide (Lupersol DDM) were added, and the mixture was cast in a film ⅛ inch thick.

The film was permitted to stand at ambient temperature for 4 hours and then cured at 90° for 10 hours.

The cured films were placed in the Fade-Ometer and exposed for 100 hours. The exposed films were inspected for color change. The results obtained are set out in the Table III below, wherein the extent of discoloration is evaluated according to the following scale:

None
Negligible
Very slight
Slight
Moderate
Appreciable
Considerable
Strong
Very strong As shown by the blank test, discoloration (yellowing) of the resin occurred in the absence of a stabilizer.

TABLE III

| Stabilizer Compound No. | Extent of Discoloration | | |
|---|---|---|---|
| | Resin A | Resin B | Resin C |
| None (Blank) | Strong | Strong | Appreciable. |
| 11 | ----do---- | Slight | Very Slight. |
| 8 | ----do---- | ----do---- | Do. |
| 1 | Slight to Moderate | ----do---- | None. |
| 2 | Moderate | ----do---- | Do. |
| 3 | ----do---- | Slight Bleaching | Do. |
| 4 | Slight to Moderate | None | Do. |
| 5 | Moderate | ----do---- | Do. |
| 7 | Slight to Moderate | Slight Bleaching | Do. |

*Example 14.*—The test procedure of Example 13 was repeated with and without Compound 1 (5-bromo-2,4-dihydroxy-benzophenone) with the addition of the prepolymer resins of 0.05% of various organic dyestuffs as coloring agents, namely:

Brilliant Oil Blue BMA (an unsymmetrical 1,4-dialkyl-amino-anthraquinone dyestuff of U.S.P. 2,211,943)
Wool Fast Blue BL Conc. (C.I. No. 833)
Quinoline Yellow Base (C.I. No. 800)

In the absence of the stabilizer, exposure of the cured colored resins in the Fade-Ometer resulted in fading of the color. In contrast thereto, exposure of the cured colored resins containing 1% of Compound 1 for a like period in the Fade-Ometer produced very little fading; the improvement in light-stability was clearly evident.

*Example 15.*—Additional comparative tests were carried out with the above polyester-styrene resins to evaluate the effectiveness of the various stabilizers on a molecularly equivalent basis. The procedure of Example 13 was employed. In the case of Compound 8 (2,4-dihydroxy-benzophenone), which has the lowest molecular weight, 1% of the weight of the prepolymer was employed; in the cases of the other stabilizers tested, a molecularly equivalent larger amount was used. The results are set out in Tables IV, V and VI below.

TABLE IV.—RESIN A

| Stabilizer Compound No. | Extent of Discoloration after 20 Hours Exposure in Fade-Ometer |
|---|---|
| Blank | Considerable. |
| 8 | Do. |
| 9 | Do. |
| 10 | Do. |
| 11 | Appreciable. |
| 12 | Do. |
| 1 | Do. |
| 4 | Do. |
| 6 | Do. |

On the basis of visual examination of the test plaques after exposure, they ranked as follows, in the order of decreasing effectiveness of stabilizer:

6>4>12>1>11>10>9>8

TABLE V.—RESIN D

| Stabilizer Compound No. | Extent of Discoloration after Exposure in Fade-Ometer | |
|---|---|---|
| | 20 Hours | 60 Hours |
| Blank | Considerable | Very Strong. |
| 8 | Slight | Appreciable. |
| 9 | ----do---- | Do. |
| 10 | None | Moderate. |
| 11 | Slight | Appreciable. |
| 12 | Moderate | Considerable. |
| 1 | None | Moderate. |
| 4 | ----do---- | Slight. |
| 6 | ----do---- | None. |

On the basis of visual examination of the test plaques after exposure, they ranked as follows, in the order of decreasing effectiveness of stabilizer:

6>4>1>10>11>9>8>12

TABLE VI.—RESIN E

| Stabilizer Compound No. | Extent of Discoloration after Exposure in Fade-Ometer for 200 Hours |
|---|---|
| Blank | Considerable. |
| 8 | Slight. |
| 9 | Do. |
| 10 | Do. |
| 11 | Do. |
| 12 | Do. |
| 1 | Very Slight. |
| 4 | Negligible. |
| 6 | None. |

On the basis of visual examination of the test plaques after exposure, they ranked as follows, in the order of decreasing effectiveness of stabilizer:

6>4>1>12>11>8>10>9

*Polyvinyl Chloride Resin*

Test films of plasticized polyvinyl chloride, with and without stabilizers, were prepared and tested as set out below. This resin is subject to pitting and discoloration (yellowing) by ultraviolet light in the absence of a stabilizer.

*Example 16.*—Fifty parts of polyvinyl chloride, 25 parts of dioctylphthalate and 284 parts of cyclohexanone were mixed together, with and without the addition of ½ part of stabilizer. Films of the resulting compositions were drawn on a glass plate, using a blade setting of 0.075 inch. The films were permitted to "set" at ambient temperature for about 16 hours, and the residual solvent was removed by heating the films in an oven for 3 days. The average thickness of the resulting films as determined by a micrometer was 0.015 inch in each instance. The films were exposed in a Fade-Ometer. The results are set out in Table VII below. As an indication of the relative effectiveness of the stabilizers it is noted that after exposure for 160 hours, the film without stabilizer (Blank) was brown and very badly pitted; the film stabilized with Compound 8 was less brown but very badly pitted; and the films stabilized with Compounds 1 and 4 were only a slight yellow in color and were only faintly pitted.

TABLE VII

| Stabilizer Compound No. | Extent of Deterioration (Yellowing and Pitting) after Exposure in Fade-Ometer | | | |
|---|---|---|---|---|
| | 80 Hours | 120 Hours | 160 Hours | 200 Hours |
| Blank | Slight | Appreciable | Considerable | Considerable. |
| 8 | do | do | do | Do. |
| 11 | do | do | Appreciable | Do. |
| 1 | do | Slight | Moderate | Moderate. |
| 2 | Very slight | do | Slight | Do. |
| 3 | Slight | Moderate | Moderate | Appreciable. |
| 4 | None | Very slight | Slight | Slight. |
| 5 | Negligible (very slight pitting) | do | do | Do. |
| 7 | Slight | Moderate | Appreciable | Appreciable. |

On the basis of visual examination of the test films after exposure, they ranked as follows, in the order of decreasing effectiveness of stabilizer:

4>5>2>1>3>7>11>8

The results of these tests show the beneficial effect of the compounds employed in accordance with the present invention as inhibitors of the deleterious action of ultraviolet light, and especially the surprising superiority of the compounds employed in accordance with the present invention as compared with compounds heretofore proposed for the purpose.

It will be evident to those skilled in the art that the invention is not limited to the details of the foregoing illustrative examples and that changes can be made without departing from the scope of the invention.

Thus, various compositions and materials subject to deterioration by ultraviolet light can be rendered resistant to ultraviolet light by having a minor amount of a 2-hydroxy-benzophenone of the type set out above incorporated therewith or into a coating applied thereto. Thus, they include various organic plastics, resins, perfumes, foodstuffs and the like. Polyester resinous compositions are particularly important, and especially the class of copolymer resins disclosed in U.S.P. 2,777,828.

Various plasticizers and catalysts may be employed in conjunction with the resinous compositions illustrated in the above specific examples, a number of which are well known in the art.

The stabilizers of this invention can be used to protect against, or otherwise retard the deterioration due to, ultraviolet light of other colorless or colored resinous materials, such as, melamine-formaldehyde resins, nylon, phenolics, acrylates and methacrylates, vinyl and vinylidene polymers and copolymers, cellulose organic esters, regenerated cellulose, epoxy resins (copolymers of bisphenols and epoxy compounds) and the like. The so stabilized products can be fabricated into the desired form by molding, extruding or laminating.

The stabilized light sensitive compositions of this invention may and usually do contain other ingredients, such as fillers, polymerization inhibitors, extenders, mold lubricants, spinning assistants, solvents, plasticizers and the like. The formulation, curing and application treatment of such compositions are well known to those skilled in the art to which the specific compositions pertain and accordingly require no extended discussion.

We claim:
1. 4-alkoxy-5-bromo-2-hydroxy-benzophenone.
2. 4-alkoxy-5-chloro-2-hydroxy-benzophenone.
3. 4-methoxy-5-bromo-2-hydroxy-benzophenone.
4. 4-dodecoxy-5-bromo-2-hydroxy-benzophenone.

References Cited in the file of this patent

UNITED STATES PATENTS

| 2,419,553 | Houtman | Apr. 29, 1947 |
| 2,565,300 | Faith et al. | Aug. 21, 1951 |
| 2,659,709 | Daglish | Nov. 17, 1953 |
| 2,831,017 | Senkbeil | Apr. 15, 1958 |
| 2,843,563 | Bell | July 15, 1958 |
| 2,861,053 | Lappin et al. | Nov. 18, 1958 |
| 2,892,872 | Forster | June 30, 1959 |

OTHER REFERENCES

Dalvi et al.: J. Indian Chem. Soc., vol. 33, pp. 807–11 (1956).